(12) United States Patent
Farwer

(10) Patent No.: US 6,303,892 B1
(45) Date of Patent: Oct. 16, 2001

(54) PROCESS FOR THE TIG ALTERNATING-CURRENT WELDING OF ALUMINUM

(75) Inventor: Alfward Farwer, Meerbusch (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/374,388

(22) Filed: Aug. 13, 1999

(30) Foreign Application Priority Data

Aug. 14, 1998 (DE) ................................................ 198 37 039

(51) Int. Cl.⁷ ...................................................... B23K 9/167

(52) U.S. Cl. ...................................... 219/75; 219/137 WM
(58) Field of Search ........................ 219/75, 74, 137 WM

(56) References Cited

U.S. PATENT DOCUMENTS 5,210,389 * 5/1993 Farwer ..................................... 219/74
5,667,703 * 9/1997 Soula et al. ............................. 219/75

\* cited by examiner

Primary Examiner—Clifford C. Shaw

(57) ABSTRACT

The process for the TIG alternating-current welding of aluminum using an inert-gas mixture of helium and argon uses an inert-gas mixture of 83 to 95% by volume of helium, the remainder being predominantly argon.

20 Claims, No Drawings

PROCESS FOR THE TIG ALTERNATING-CURRENT WELDING OF ALUMINUM

BACKGROUND OF THE INVENTION

This application is related to DE 198 37 039.3 filed on Aug. 14, 1998, which is incorporated by reference in its entirety for all purposes.

The present invention relates to a process for the TIG alternating-current welding of aluminum using an inert-gas mixture of helium and argon.

TIG welding is of great significance in the processing of aluminum. Aluminum materials have a high thermal conductivity and therefore require high levels of energy input. Furthermore, they are characterized by a high-melting oxide layer, which requires special process-engineering measures for its reliable destruction during the welding process. For this reason, in the TIG process aluminum is preferably welded under alternating current.

In the case of medium and, in particular, higher sheet thicknesses, it is often advantageous for the energy input to use mixtures of helium and argon instead of pure argon. However, increasing proportions of helium lead to arc destabilization, which can be compensated by technical equipment aspects only within certain limits.

In the view of persons skilled in the art, although higher proportions of helium in the inert-gas mixture lead to advantages in the intensification of the fusion penetration, this leads to disadvantages from process-engineering aspects, in particular to inadequate arc stability. Therefore, a helium content of 70 to 80% is regarded as the tolerable maximum.

DE-C-40 07 673 discloses a process for the inert-gas welding of aluminum with direct current, a negatively poled tungsten electrode and freehand torch manipulation, it being intended for the inert gas to consist of at least 85% helium and a residual proportion of argon. In this case, however, the end of the tungsten electrode must be of a rounded design. For this process, an inert-gas mixture containing 90% helium is offered and marketed by the Linde company under the designation VARIGON: cf. the article from Linde-KnowHow 2/97 "Ein vorteilhaftes "Paar"" [an advantageous "pair"].

Manual TIG welding with straight polarity is consequently possible in principle but nevertheless more difficult to carry out than the customary alternating-current welding. It therefore only represents an emergency solution, when no alternating-current equipment is available for a welding job; cf. A. Farwer, Krefeld and H. Wehner, Frankfurt in the article "Schutzgasschweißen" [inert-gas welding] from DVS Berichtsband 1985, page 3, left-hand column. In addition, this article provides an overview summarizing the advantages and disadvantages of this specialized area. Page 4, FIG. 9 reveals that inert-gas mixtures comprising 70% helium and 30% argon just about lead to an acceptable variation over time of current and voltage, while pure helium leads to uncertain and no longer acceptable conditions.

SUMMARY OF THE INVENTION

The object of the invention is to further improve processes for the TIG alternating-current welding of aluminum and aluminum-containing alloys using an inert-gas mixture of helium and argon and at the same time ensure good arc stability with maximized energy input, it also being intended to optimize the weld ripples, the formation of the cleaning zone and the initial fusion penetration.

In accordance with this invention a process for the TIG alternating-current welding of aluminum and aluminum containing alloys uses an inert-gas mixture containing from 83 to 95% by volume of helium with the remainder being predominantly argon.

DETAILED DESCRIPTION

An inert-gas mixture of helium and argon which contains 83 to 95% by volume of helium and the remainder is predominantly argon is used. The inert-gas mixture preferably contains 86 to 92.5% by volume of helium and an inert-gas mixture which contains 89 to 90.5% by volume of helium is particularly preferred.

Among the aluminum-containing alloys are aluminum alloys with aluminum as the main component and small proportions of other metals such as copper, magnesium, silicon, manganese or zinc.

It has surprisingly been found that in this range of mixtures the sum of all the properties is at an optimum during welding and in the welding results.

For instance, during the welding of 6 mm thick plates of AlMg3 with a filler likewise of AlMg3 (4 mm diameter) as a fillet weld on a tee joint in a horizontal welding position, it was found that it was possible to weld just as quickly with the 89.5% by volume of helium and 10.5% by volume of argon mixture at a current intensity of 200 A as under pure helium. In comparison with pure argon, the welding was 30% quicker, in comparison with a mixture of 75% by volume of helium and 25% by volume of argon it was 10% quicker. With the 89.5% by volume of helium and 10.5% by volume of argon mixture, the weld ripples were regular and the melt pool had flowed uniformly up to the weld edges. On the other hand, under pure helium, the weld ripples and the flowing up to the weld edges were very uneven.

The process according to the invention allows work be carried out quickly and reliably, at the same time allowing a good weld pattern and a good process sequence to be ensured, so that even a welder with an average level of practical competence is not continually reaching his limits.

It has further been found that, by small additions of other gases, in particular two- to seven-atom gases, additional effects that are beneficial in certain applications can be brought about. The addition of certain other gases lies in the range of respectively 40 to 700 vpm, with 40 to 200 vpm of nitrogen and/or 100 to 600 vpm of oxygen, depending on specific conditions, leading to optimized results. Further examples of other gases are carbon monoxide (CO), dinitrogen monoxide ($N_2O$), carbon dioxide ($CO_2$) and sulfur hexafluoride ($SF_6$). As a result, the fusion penetration profile can be selectively modified within certain limits, for example toward further improved inclusion of the welding root. Also, in the case of magnesium-containing alloys, the porosity of the welding seam can be influenced if the degassing conditions are unfavorable.

What is claimed is:

1. A process for the TIG alternating-current welding of aluminum and aluminum containing alloys using an inert-gas mixture of helium and argon, wherein parts of aluminum or aluminum-containing alloys are welded using an inert-gas mixture which contains 83 to 95% by volume of helium and the remainder is argon, and whereby the helium and argon together give 100% by volume.

2. The process as claimed in claim 1 wherein the inert-gas mixture contains 86 to 92.5% by volume of helium.

3. The process as claimed in claim 2 wherein the inert-gas mixture contains 89 to 90.5% by volume of helium.

4. The process as claimed in claim 3 wherein the inert-gas mixture contains 40 to 700 vpm of two- to seven-atom gas.

5. A process for the TIG alternating-current welding of aluminum and aluminum containing alloys using an inert-gas mixture of helium and argon, wherein parts of aluminum or aluminum-containing alloys are welded using an inert-gas mixture which contains 83 to 95% by volume of helium and the remainder is predominantly argon, and the inert-gas mixture contains 40 to 200 vpm of nitrogen.

6. The process as claimed in claim 5 wherein the inert-gas mixture contains 100 to 600 vpm of oxygen.

7. The process as claimed in claim 5 wherein the inert-gas mixture contains 86 to 92.5% by volume of helium.

8. The process as claimed in claim 7 wherein the inert-gas mixture contains 89 to 90.5% by volume of helium.

9. A process for the TIG alternating-current welding of aluminum and aluminum containing alloys using an inert-gas mixture of helium and argon, wherein parts of aluminum or aluminum-containing alloys are welded using an inert-gas mixture which contains 83 to 95% by volume of helium and the remainder is predominantly argon and, the inert-gas mixture contains 100 to 600 vpm of oxygen.

10. The process as claimed in claim 9 wherein the inert-gas seven-atom gas.

11. The process as claimed in claim 10 wherein the inert-gas mixture contains 40 to 200 vpm of nitrogen.

12. The process as claimed in claim 9 wherein the inert-gas mixture contains 86 to 92.5% by volume of helium.

13. The process as claimed in claim 12 wherein the inert-gas mixture contains 89 to 90.5% by volume of helium.

14. Use of an inert-gas mixture of helium and argon for the TIG alternating-current welding of aluminum or aluminum-containing alloys, wherein the inert-gas mixture contains 83 to 95% by volume of helium and the remainder is predominantly argon, and the helium and argon together give 100% by volume.

15. Use of an inert-gas mixture of helium and argon for the TIG alternating-current welding of aluminum or aluminum-containing alloys, wherein the inert-gas mixture contains 40 to 700 vpm of a gas selected from the group consisting of nitrogen, oxygen, carbon monoxide (CO), dinitrogen monoxide ($N_2O$), carbon dioxide ($CO_2$) and sulfur hexafluoride ($SF_6$), the inert-gas mixture comprises 83 to 95% by volume of helium, 100 to 600 vpm of oxygen and argon as the remainder, so that the proportions of the gases together give 100% by volume.

16. The use as claimed in claim 15 wherein the inert-gas mixture contains 86 to 92.5% by volume of helium.

17. Use of an inert-gas mixture of helium and argon for the TIG alternating-current welding of aluminum or aluminum-containing alloys, wherein the inert-gas mixture contains 40 to 700 vpm of a gas selected from the group consisting of nitrogen, oxygen, carbon monoxide (CO), dinitrogen monoxide ($N_2O$), carbon dioxide ($CO_2$) and sulfur hexafluoride ($SF_6$), the inert-gas mixture comprises 83 to 95% by volume of helium, 40 to 200 vpm of nitrogen and argon as the remainder, so that the proportions of the gases together give 100% by volume.

18. The use as claimed in claim 17 wherein the inert-gas mixture contains 86 to 92.5% by volume of helium.

19. Use of an inert-gas mixture of helium and argon for the TIG alternating-current welding of aluminum or aluminum-containing alloys, wherein the inert-gas mixture contains 40 to 700 vpm of a gas selected from the group consisting of nitrogen, oxygen, carbon monoxide (CO), dinitrogen monoxide ($N_2O$), carbon dioxide ($CO_2$) and sulfur hexafluoride ($SF_6$), the inert-gas mixture comprises 83 to 95% by volume of helium, 100 to 600 vpm of oxygen and 40 to 200 vpm of nitrogen and argon as the remainder, so that the proportions of the gases together give 100% by volume.

20. The use as claimed in claim 19 wherein the inert-gas mixture contains 86 to 92.5% by volume of helium.

* * * * *